United States Patent [19]

Akutsu

[11] Patent Number: 4,638,392
[45] Date of Patent: Jan. 20, 1987

[54] MAGNETIC HEAD PRESSURE PAD DEVICE

[75] Inventor: Mitsuru Akutsu, Kawasaki, Japan

[73] Assignee: Tokyo Shibaura Denki Kabushiki Kaisha, Kawasaki, Japan

[21] Appl. No.: 477,362

[22] Filed: Mar. 21, 1983

[30] Foreign Application Priority Data

Jul. 12, 1982 [JP] Japan .................. 57-105393[U]

[51] Int. Cl.$^4$ .................. G11B 15/60; G11B 5/56
[52] U.S. Cl. .................. 360/130.32; 360/109
[58] Field of Search .................. 360/130.3–130.34, 360/104, 105, 109

[56] References Cited

U.S. PATENT DOCUMENTS 4,028,734  6/1977  Mos .
4,320,429  3/1982  Knerich .................. 360/130.34

FOREIGN PATENT DOCUMENTS 775768    1/1968   Canada .................. 360/130.32
2362094   6/1975   Fed. Rep. of Germany .
2080456  11/1971   France .
2145994   2/1973   France .
2227591  11/1974   France .
2018488  10/1979   United Kingdom .

OTHER PUBLICATIONS

Patents Abstracts of Japan, vol. 3, No. 38, 30th Mar. 1979, p. 125 E 101; & JP-A-54 17 708 (Tokyo Shibaura Denki K.K.) 09-02-1979.
Patents Abstracts of Japan, vol. 5, No. 138(p-78) [810], 2nd Sep. 1981; & JP-A-56 74 808 (Ricoh K.K.) 20-06-1981.

Primary Examiner—A. J. Heinz
Attorney, Agent, or Firm—Oblon, Fisher, Spivak, McClelland & Maier

[57] ABSTRACT

A magnetic head of a magnetic head device has a head guide which has a groove in its side surface. A support table has a recess in which the lower portion of the head guide is fitted. Screws are screwed upward from the bottom of the support table and extend into the recess. The head guide is supported on the screws. An elastic plate which has central and radially extending perforations at its center portion is mounted on the upper surface of the support table. A portion of the elastic member which defines the central perforation is fitted in the groove of the head guide. The head guide is then biased toward the screws When the screws are turned, the level and azimuth of the magnetic head can be adjusted. A pressure pad is also adjusted by other screws to be set at a selected position relative to the magnetic head and at a selected tilt angle with respect to the magnetic head.

8 Claims, 7 Drawing Figures

MAGNETIC HEAD PRESSURE PAD DEVICE

BACKGROUND OF THE INVENTION

The present invention relates to a magnetic head device wherein a magnetic head can be precisely set in a predetermined direction with respect to a magnetic recording medium and a pressure pad can be precisely set in a predetermined direction so as to bring the magnetic recording medium into close contact with the magnetic head.

High density recording has recently been demanded in magnetic recording techniques. For this reason, perpendicular magnetic recording is receiving a great deal of attention as opposed to conventional longitudinal-direction magnetic recording. In a perpendicular magnetic recording system, the magnetic medium is magnetized in a direction perpendicular to its surface, thereby achieving high density recording. However, as the density of the recorded signals is increased, their wavelengths are shortened (i.e., the frequency of the signal increases), so that the recording and reproduction characteristics are highly sensitive to and greatly influenced by the spacing between the magnetic head and the recording medium. In order to obtain good recording and reproduction characteristics, the predetermined positional relationships of the magnetic head and the magnetic recording medium must be established with high precision. However, with the conventional magnetic head device, proper sliding contact between the recording medium and the magnetic head cannot be achieved.

FIGS. 1 and 2 show conventional magnetic head devices. A floppy disc 1 as a recording medium is rotated by a rotary support unit 2. The floppy disc 1 is mounted on a spindle 3 of the rotary support unit 2 such that a hole 1a at the center of the floppy disc 1 is aligned with a rotating shaft of the rotary support unit 2. The floppy disc 1 is rotated by a motor (not shown) together with the spindle 3 through a belt 4. A magnetic head 5 is fixed on a support table 6. An L-shaped member 7 is fixed on the support table 6. A support plate 9 is mounted on the L-shaped member 7 through an elastic portion 9a such that one end of the elastic portion 9a is fixed on the side wall of the L-shaped member 7 and the other end thereof is fixed on the support plate 9. A pressure pad 8 is fixed on the lower surface of the support plate 9 so as to oppose the magnetic head 5 through the floppy disc 1. The pressure pad 8 biases the floppy disc 1 toward the magnetic head 5 via a coil spring 9b. The coil spring 9b is mounted between the inner surface of the upper wall of the L-shaped member 7 and the upper surface of the support plate 9. In the conventional magnetic head device, the sliding contact between the magnetic head 5 and the floppy disc 1 cannot be properly attained. Furthermore, often due to misalignment of the pressure pad center and the head gap center, the sliding contact between the pressure pad 8 and the floppy disc 1 cannot be adjusted, so that the pressure pad 8 cannot bias the floppy disc 1 toward the head gap of the magnetic head 5 with a constant, uniform pressure.

In the perpendicular magnetic recording system, a magnetic recording medium may be used which comprises a base layer such as a polyester film and a cobalt-chromium alloy layer sputtered on the base layer. The magnetic recording medium of this type has high rigidity and may not be properly brought into close contact with a tape guide surface of the magnetic head. For these reasons, a space tends to be formed between the recording medium and the tape guide surface of the magnetic head. Therefore, the sliding contact between the magnetic head 5 and the floppy disc 1 cannot be properly kept when the pressure pad 8 fixed to the support plate 9 is used. As a result, good recording and reproduction characteristics cannot be obtained. Furthermore, when the magnetic head 5 wears out, it cannot be readily replaced with a new one.

On the other hand, among audio magnetic head devices, there is a magnetic head device, as shown in FIG. 2, in which the position of a magnetic head 5 can be adjusted. The magnetic head 5 is mounted on a support plate 10. Screws 11 are mounted to adjust the level of the support plate 10 with respect to a support table 6. Coil springs 12 are respectively mounted on the screws 11 between the support table 6 and the support plate 10, so that the support plate 10 and hence, the magnetic head 5 are biased upward. As a result, an operator can turn the screws 11 to adjust the distance between the support plate 10 and the support table 6. However, according to the adjustment mechanism of this type, the head position cannot be adjusted with high precision with respect to the floppy disc 1. Furthermore, this adjustment mechanism is rather large and cannot be installed in a compact floppy disc recording/reproduction apparatus.

Briefly, in conventional magnetic head devices, sliding contact between the recording medium and the pressure pad, and between the recording medium and the magnetic head, cannot be precisely achieved. If such a magnetic head device is applied to a perpendicular magnetic recording system, good recording and reproduction characteristics cannot be obtained.

OBJECTS OF THE INVENTION

It is an object of the present invention to provide a magnetic head device wherein a magnetic head can be set to a predetermined position with high precision, and the sliding contact between a tape guide surface of the magnetic head and a recording medium can be achieved with high precision, thereby obtaining and maintaining good recording and reproduction characteristics.

It is another object of the present invention to provide a magnetic head device wherein a pressure pad can be set to a predetermined position with high precision so as to uniformly bias the magnetic medium, thereby maintaining optimum sliding contact between the tape guide surface of the magnetic head and the recording medium.

It is still another object of the present invention to provide a highly reliable magnetic head device which allows easy replacement of the magnetic head.

It is still another object of the present invention to provide a magnetic head device for high-density recording and reproduction, especially in a perpendicular magnetic recording system, which provides good recording and reproduction characteristics.

SUMMARY OF THE INVENTION

In order to achieve the above objects of the present invention, there is provided a magnetic head device comprising: a magnetic head for recording a signal on a magnetic recording medium and for reproducing the signal therefrom and supporting means for supporting the magnetic head. The magnetic head has a head guide which has a guide surface in sliding contact with the magnetic recording medium. The head guide also has an engaging portion in a side surface thereof. The supporting means comprises: a support table; a support member attached to said support table and arranged to be movable so as to support and move the head guide toward and away from the recording medium; and an elastic member which is provided on the support table and engages the engaging portion and which biases the head guide toward the support member. The magnetic head device according to the present invention may further comprise a pressure pad opposing the guide surface so as to bias the recording medium toward the guide surface, the recording medium travelling between the guide surface and the pressure pad. The pressure pad is mounted on a mounting portion. A supporting portion comprises: a base member for supporting the mounting portion so that it may be movable in directions along which the mounting portion is moved closer to and away from the guide surface; an elastic member for biasing the mounting portion along one of these directions; and a stopper member provided on the base member so as to be movable along these directions so as to prevent movement of the mounting portion in one of the directions. The supporting portion as a whole is elastically biased toward the magnetic head.

DETAILED DESCRIPTION OF THE PREFERRED EMBODIMENT

Figure 1:
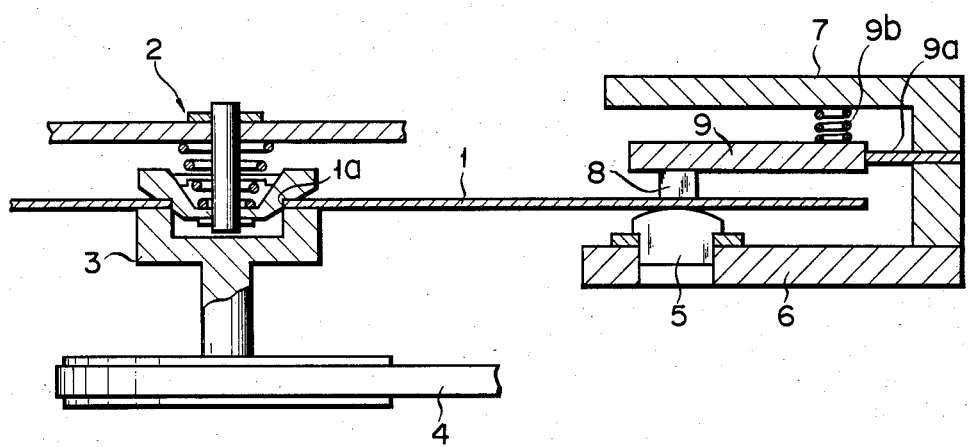
FIGS. 1 and 2 are longitudinal sectional views of conventional magnetic head devices, respectively.
Figure 2:
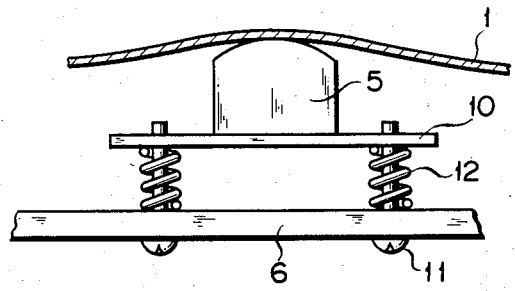
Figure 3:
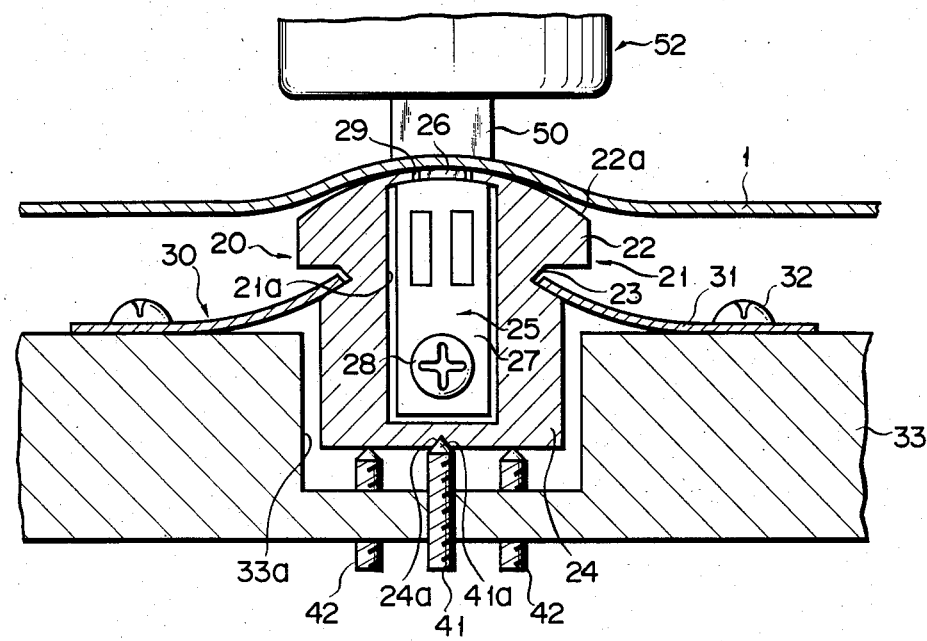
FIG. 3 is a sectional view showing a magnetic head and its related parts in a magnetic head device according to an embodiment of the present invention.
Figure 4:
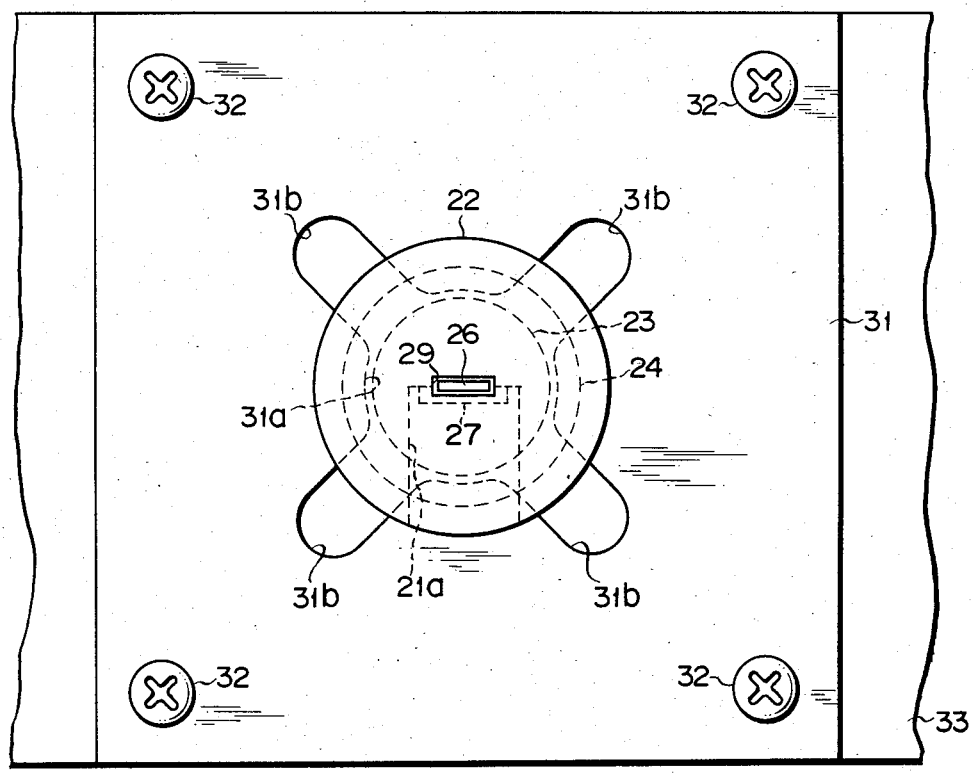
FIG. 4 is a plan view of the magnetic head and its related parts shown in FIG. 3.
Figure 5:
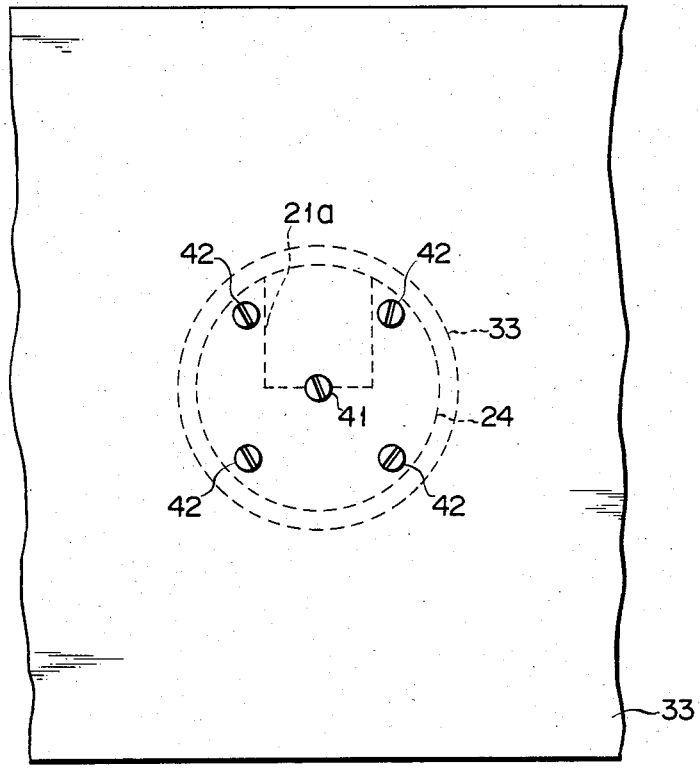
FIG. 5 is a bottom view of the magnetic head and its related parts shown in FIG. 3.

FIGS. 3 to 5 show a magnetic head and its related parts in a magnetic head device according to an embodiment of the present invention. A magnetic head 20 opposes a pressure pad 50 through a floppy disc 1 as a recording medium. The magnetic head 20 is in contact with one surface of the floppy disc 1 which has magnetically recorded signals thereon. The pressure pad 50 is in contact with the other surface of the floppy disc 1. The magnetic head 20 mainly has a head guide 21 and a head unit 25, the latter being mounted in the head guide 21. The head guide 21 substantially comprises a cylinder and has an upper guide portion 22 and a lower main body 24. The upper guide portion 22 has a guide surface 22a which is brought into slidable contact with the floppy disc 1. The diameter of the lower main body 24 is slightly smaller than the outer diameter of the upper guide portion 22. A groove 23 is formed between the upper guide portion 22 and the lower main body 24. The portion of the head guide 21 which corresponds to the groove 23 has a diameter smaller than the outer diameter of the lower main body 24. The guide surface 22a of the head guide 21 (that is, the upper surface of the upper guide portion 22) has a domed or arcuated shape so as to be smoothly brought into slidable contact with the recording medium such as the floppy disc 1. The lower surface of the head guide 21 (that is, the lower surface of the lower main body 24) is flat. The head guide 21 has a recess 21a in a side surface thereof. The floor of the recess 21a has a substantially rectangular shape and corresponds to substantially the center of the head guide 21. A rectangular hole 29 is situated at the center of the guide surface 22a so as to communicate with the recess 21a. The head unit 25 is fitted in the recess 21a. The head unit 25 comprises a rectangular base plate 27 which is slightly smaller than the rectangular area of the floor of the recess 21a, and a head chip 26 formed at one end portion of the rectangular base plate 27. The head unit 25 is fitted in the recess 21a such that its longitudinal direction is normal to the horizontal direction, and the head chip 26 is fitted in the rectangular hole 29 so as to be exposed on the upper surface of the head guide 21. The head unit 25 is then fixed by a screw 28 in the head guide 21. In order to replace the head chip 26, the screw 28 is unscrewed to remove the head unit 25 as a whole.

A supporting means 30 includes a support table 33, a pivot screw 41, four adjustment screws 42, and an elastic plate 31. The support table 33 has a columnar recess 33a whose diameter is slightly greater than the outer diameter of the lower main body 24 of the head guide 21. Most of the lower main body 24 of the head guide 21 is inserted in the columnar recess 33a. The pivot screw 41 is mounted at the center of the bottom wall of the columnar recess 33a in the support table 33 to be normal to the inner bottom surface of the columnar recess 33a so as to correspond to the center of the magnetic head 20. The adjustment screws 42 are also mounted in the bottom wall of the support table 33 such that they are arranged at equal angular intervals on an imaginary circle which has a diameter smaller than that of the lower main body 24. The magnetic head 20 is thus placed on the tips of the pivot screw 41 and the adjustment screws 42 extending into the columnar recess 33a. A small recess 24a is formed at the center of the lower surface of the lower main body 24 of the magnetic head 20. A conical tip 41a of the pivot screw 41 is fitted in the small recess 24a, thereby aligning the magnetic head 20 in the center of the bottom wall of the columnar recess 33a of the support table 33. The pivot screw 41 and the adjustment screws 42 are turned by a screwdriver or the like to be moved relative to the support table 33. Therefore, when the pivot screw 41 is turned, the height or level of the magnetic head 20 is changed. When the adjustment screws 42 are selectively turned, the azimuth of the magnetic head 20 can be adjusted.

The elastic plate 31 preferably rectangular in shape and is mounted on the upper surface of the support table 33 so as to align its center with the center of the columnar recess 33a. The elastic plate 31 has a predetermined elasticity. The four corners of the elastic plate 31 are respectively fixed by four screws 32 on the support table 33. The central portion of the elastic plate 31 is perforated to form a central perforation 31a which corresponds to the groove 23 of the head guide 21. Four radial perforations 31b are formed in the elastic plate 31 to radially extend from the central perforation 31a. The diameter of the central perforation 31a is slightly greater than that of the portion of the head guide 21 which corresponds to the groove 23 and is slightly smaller than that of the lower main body 24. The central perforation 31a and the radial perforations 31b can be formed at predetermined positions in the elastic plate 31 by a high-precision machine tool, an electric spark machine, or an etching machine. The portions of the elastic plate 31 in the vicinity of the central perforation 31a fit into the groove 23 of the magnetic head 20, so that the magnetic head 20 is biased downward by the elastic plate 31 toward the pivot screw 41 and the adjustment screw 42. Since the lower surface of the magnetic head 20 is supported by the pivot screw 41 and the adjustment screws 42, the magnetic head 20 is fixed on the support table 33 by means of the elastic plate 31 and the pivot screw 41 and the adjustment screws 42.

Figure 6:
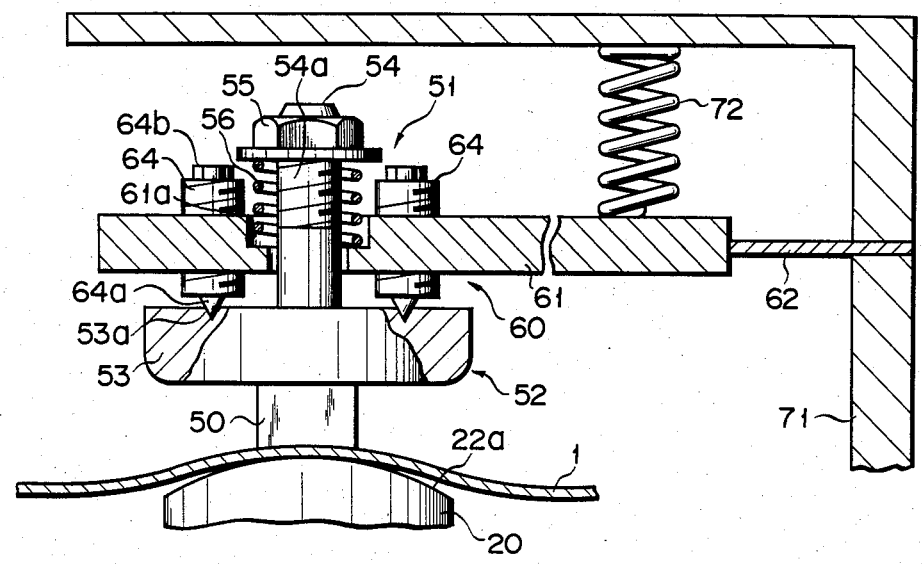
FIG. 6 is a sectional view showing a pressure pad and its related parts in the magnetic head device shown in FIG. 3.
Figure 7:
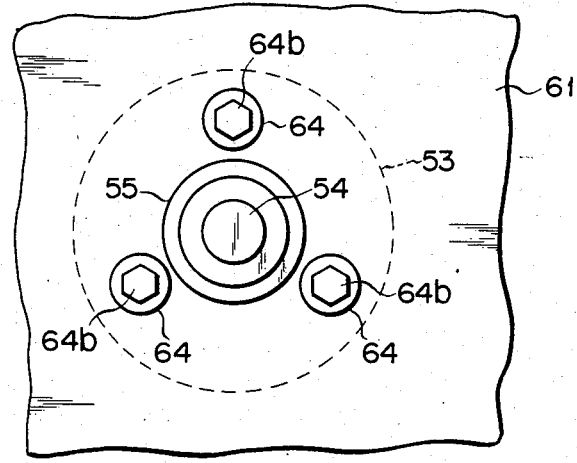
FIG. 7 is a plan view of the pressure pad and its related parts shown in FIG. 6.

A support mechanism of the pressure pad 50 will now be described with reference to FIGS. 6 and 7. A support unit 51 of the pressure pad 50 has a mounting portion 52 on which the pressure pad 50 is mounted and a support portion 60 for supporting the mounting portion 52 so as to be movable relative to the floppy disc 1. The support portion 60 mainly comprises a base plate 61 and three adjustment screws 64. An L-shaped mounting member 71 is mounted on the support table 33 (see FIG. 3). The base plate 61 is mounted on the side wall of the L-shaped mounting member 71 through an elastic member 62. The mounting portion 52 comprises a disc 53 which has the pressure pad 50 fixed by an adhesive at the center of the lower surface thereof. The mounting portion 52 also has a shaft 54 mounted at the center of the upper surface of the disc 53 to be perpendicular thereto. The shaft 54 and the disc 53 may be formed to be integral with each other. The shaft 54 extends through the base plate 61 at a portion thereof immediately above the magnetic head 20 to be perpendicular to the base plate 61, such that the shaft 54 is vertically movable with respect to the base plate 61. Threads 54a are formed in the peripheral surface of the shaft 54 at the upper half portion thereof. A nut 55 is screwed onto the threads 54a. A groove 61a is formed to a depth corresponding to half the thickness of the base plate 61 in a portion of the base plate 61 which corresponds to a portion surrounding the shaft 54. A compression coil spring 56 is mounted on the shaft 54 such that one end of the compression coil spring 56 is stopped at the nut 55 and the other end thereof engages the groove 61a. Therefore, the nut 55 is biased by the compression coil spring 56 in a direction away from the base plate 61, and the disc 53 is biased to move closer to the base plate 61. The three adjustment screws 64 are screwed extending through the base plate 61 at equal angular intervals to be perpendicular to the base plate 61 such that they are arranged on an imaginary circle having the shaft 54 as its center and a diameter smaller than that of the disc 53. When the adjustment screws 64 are turned through hexagonal nut portions 64b respectively mounted thereon, the adjustment screws 64 are moved relative to the base plate 61. Conical recesses 53a are formed at the upper surface of the disc 53 so as to respectively correspond to tips 64a of the adjustment screws 64, so that the tips 64a engage the conical recesses 53a, respectively. The disc 53 which has the pressure pad 50 on its lower surface is engaged with the adjustment screws 64 and is biased upward by the compression coil spring 56. Thus, the disc 53 is fixed with respect to the base plate 61. The distance between the disc 53 and the base plate 61 and a tilt angle of the disc 53 with respect to the base plate 61 can be adjusted by adjusting the adjustment screws 64.

A compression coil spring 72 is inserted between the lower surface of the upper portion of the L-shaped mounting member 71 and the base plate 61. The compression coil spring 72 urges the base plate 61 downwardly (i.e., toward the magnetic head 20) against the biasing force of the elastic member 62. Therefore, the pressure pad 50 urges the floppy disc 1 toward the magnetic head 20, while the floppy disc 1 passes along a path between the pressure pad 50 and the magnetic head 20.

The operation of the magnetic head device will now be described. The lower main body 24 of the head guide 21 is inserted through the central perforation 31a of the elastic plate 31 while the portions of the elastic plate 31 in the vicinity of the central perforation 31a are held upward. The lower main body 24 and, hence, the magnetic head 20, is fitted in the columnar recess 33a of the support table 33. The above-mentioned portions of the elastic plate 31 are fitted in the groove 23 of the head guide 21. The magnetic head 20 is biased downward by the elastic plate 31. The lower surface of the lower main body 24 fitted in the columnar recess 33a is supported by the pivot screw 41 and the adjustment screws 42. In this case, since the conical tip 41a of the pivot screw 41 is fitted in the small recess 24a in the lower surface of the main body 24, the magnetic head 20 may not move in a plane parallel to the surface of the support table 33. The height of the portion of the magnetic head 20 extending from the support table 33 relative to the support table 33 can be adjusted by the pivot screw 41. The azimuth of the magnetic head 20 with respect to the support table 33 can be adjusted by selectively turning the four adjustment screws 42. Therefore, the guide surface 22a of the magnetic head 20 may be brought into optimal contact with the floppy disc 1, such that the head gap of the magnetic head 20 is precisely aligned with the center of the sliding contact area between the guide surface 22a and the floppy disc 1.

The positional relationship between the mounting portion 52 and the support portion 60 can be adjusted by adjusting the adjustment screws 64 in the support unit 51. When all three adjustment screws 64 are turned to move the disc 53 downwardly (i.e., the adjustment screws 64 are turned to separate the disc 53 from the base plate 61), the pressure pad 50 is separated from the base plate 61 (i.e., the pressure pad 50 is moved downwardly). The biasing force applied to the pressure pad 50 is increased: the compression coil spring 72 increasingly urges the pressure pad 50 downwardly which then increasingly urges the floppy disc 1 toward the magnetic head 20. However, when the adjustment screws 64 are turned to move the disc 53 closer to the base plate 61, the pressure applied to the pressure pad 50 is decreased. Thus, the pressure applied to the pressure pad 50 can be adjusted. The tilt angle of the mounting portion 52 with respect to the support portion 60 can be adjusted by selectively turning the adjustment screws 64. This tilt angle adjustment brings the pressure pad 50 into optimal slidable contact with the floppy disc 1 with a uniform pressure.

ADVANTAGES OF THE INVENTION

According to the present invention, the azimuth of the magnetic head can be adjusted with respect to the recording medium, thereby providing highly precise fine adjustment of the azimuth of the magnetic head. The pressure pad can also be brought into contact with the recording medium at an optimum and uniform pressure and with high precision. Therefore, when this magnetic head device is used for high density recording/reproduction, especially for perpendicular recording/reproduction, good recording/reproduction characteristics can be obtained. Hence, the present invention can be effectively applied to high density recording, especially perpendicular magnetic recording.

According to the present invention, a readily replaceable magnetic head device is provided. The magnetic head device is simple in construction, thereby allowing mass-production of compact magnetic head devices at low cost. Furthermore, the user can easily adjust the magnetic head and the pressure pad. Therefore, even if deformation of the pressure pad occurs in use, optimum recording/reproduction characteristics can be constantly obtained.

In the above embodiment, the magnetic head device is applied to a floppy disc type recording/reproduction apparatus. However, the present invention is not limited to such an application, but may be extended to a recording/reproduction apparatus such as an audio tape recorder, a stationary head type video tape recorder, or a video disc. Other changes and modifications may be made within the spirit and scope of the present invention. For example, in the above embodiment, the numbers of adjustment screws 42, radial perforations 31b, and adjustment screws 64 are not limited to 4, 4, and 3, respectively. These may be arbitrarily selected as needed.

What is claimed is:
1. A magnetic head device comprising:
(a) a magnetic head for recording a signal on a recording medium and for reproducing the signal therefrom, said magnetic head comprising:
  (i) a head guide including an engaging portion in a side surface thereof and p2 (ii) a guide surface which is brought into sliding contact with the recording medium during use of the device;
(b) supporting means for supporting said magnetic head, said supporting means comprising:
  (i) a support table;
  (ii) a support member attached to said support table and arranged to be movable so as to support and move said magnetic head toward and away from said support table; and
  (iii) an elastic member provided on said support table and engaged with said engaging portion in said head guide so as to bias said head guide toward said support member;
(c) a pressure pad opposing said guide surface in position to urge a recording medium which travels between said guide surface and said pressure pad toward said guide surface during use of the device;
(d) a mounting portion for mounting said pressure pad; and
(e) a supporting portion for supporting said mounting portion, said supporting portion comprising:
  (i) a base plate movably mounted with respect to said support table;
  (ii) means for resiliently biasing said base plate toward said magnetic head;
  (iii) a shaft on which said mounting portion is mounted, said shaft being slidably received in a throughhole in said base plate;
  (iv) means for biasing said mounting portion toward said base plate; and
  (v) a plurality of threaded members threadedly engaged in said base plate and bearing against said mounting portion, said plurality of threaded members being usable to adjust the distance between said mounting portion and said base plate by turning said plurality of threaded members in said base plate.

2. A magnetic head device as recited in claim 1 wherein said plurality of threaded members are arranged at equiangular intervals on an imaginary circle the center of which lies on the axis of said shaft.

3. A magnetic head device as recited in claim 1 wherein said means for biasing said mounting portion toward said base plate comprises:
(a) threads on said shaft;
(b) an abutment member that threadedly engages the threads on said shaft and is movable relative to said shaft; and
(c) a compression spring having opposite ends, one end of said compression spring bearing against said abutment member and the opposite end of said compression spring bearing against said base plate.

4. A magnetic head device as recited in claim 1 wherein said support member comprises a plurality of threaded members threadedly engaged in said support table and bearing against said magnetic head, said plurality of threaded members being usable to adjust the distance between said magnetic head and said support table by turning said plurality of threaded members in said support table.

5. A magnetic head device as recited in claim 4 wherein said plurality of threaded members threadedly engaged in said support table comprises a pivot threaded member that is coaxial with said shaft and a plurality of adjustment threaded members, said plurality of adjustment threaded members being arranged at equiangular intervals on an imaginary circle the center of which lies on the axis of said pivot threaded member.

6. A magnetic head device as recited in claim 5 wherein said pivot threaded member has a conical tip which is received in a small recess in said magnetic head, whereby lateral movement of said magnetic head relative to said pivot threaded member is prevented.

7. A magnetic head device as recited in claim 1 wherein:
(a) said magnetic head is at least generally cylindrical in shape and
(b) said engaging portion is an annular groove.

8. A magnetic head device comprising:
(a) a magnetic head for recording a signal on a recording medium and for reproducing the signal therefrom, said magnetic head comprising:
  (i) a head guide including an engaging portion in one side thereof and
  (ii) a guide surface to be put in sliding contact with a recording medium;
(b) supporting means for supporting said magnetic head;
(c) a pressure pad opposing said guide surface to urge the recording medium toward said guide surface;
(d) a mount on which said pressure pad is placed;
(e) a support having a base member supporting said mount and being able to move toward or away from said magnetic head;
(f) an elastic member biasing said mount to move said mount away from said magnetic head;
(g) a plurality of stopper members provided on said base member for limiting the movement of said mount away from said magnetic head, at least one of said stopper members being movable toward or away from said magnetic head and said mount to adjust the position of said pressure pad; and
(h) an elastic support member supporting said support and biasing said support toward said magnetic head.

* * * * *